United States Patent
Meygret et al.

(10) Patent No.: US 9,258,528 B2
(45) Date of Patent: Feb. 9, 2016

(54) METHOD FOR CONTROLLING A DECODER AND DECODER FOR IMPLEMENTING SAID METHOD

(75) Inventors: Sylvain Meygret, Rueil-Malmaison (FR); Thomas Landais, Rueil-Malmaison (FR); François Lagaise, Rueil-Malmaison (FR)

(73) Assignee: SAGEMCOM BROADBAND SAS, Rueil-Malmaison (FR)

(*) Notice: Subject to any disclaimer, the term of this patent is extended or adjusted under 35 U.S.C. 154(b) by 200 days.

(21) Appl. No.: 13/378,968

(22) PCT Filed: Jun. 18, 2010

(86) PCT No.: PCT/EP2010/058654
§ 371 (c)(1),
(2), (4) Date: Mar. 23, 2012

(87) PCT Pub. No.: WO2010/146165
PCT Pub. Date: Dec. 23, 2010

(65) Prior Publication Data
US 2012/0177341 A1    Jul. 12, 2012

(30) Foreign Application Priority Data
Jun. 18, 2009    (FR) ..................... 09 54100

(51) Int. Cl.
*H04N 5/76* (2006.01)
*H04N 7/16* (2011.01)
*H04N 21/426* (2011.01)
*H04N 21/438* (2011.01)
*H04N 21/442* (2011.01)

(52) U.S. Cl.
CPC .......... *H04N 7/163* (2013.01); *H04N 21/4263* (2013.01); *H04N 21/4382* (2013.01); *H04N 21/4424* (2013.01)

(58) Field of Classification Search
None
See application file for complete search history.

(56) References Cited

U.S. PATENT DOCUMENTS

| | | | |
|---|---|---|---|
| 6,704,489 B1 * | 3/2004 | Kurauchi et al. | ............. 386/248 |
| 6,920,641 B1 | 7/2005 | Hanai et al. | |
| 2005/0033846 A1 | 2/2005 | Sankaranarayan et al. | |
| 2005/0138140 A1 * | 6/2005 | Wen | .................. G06F 17/30902 709/217 |
| 2006/0035610 A1 | 2/2006 | Potrebic | |
| 2008/0148049 A1 * | 6/2008 | Moore | ...................... H04L 9/32 713/167 |

FOREIGN PATENT DOCUMENTS

| | | |
|---|---|---|
| WO | WO 03/025726 | 3/2003 |
| WO | WO 2009/053401 | 4/2009 |

OTHER PUBLICATIONS

International Search Report as issued for PCT/EP2010/058654.

* cited by examiner

*Primary Examiner* — Hung Dang
*Assistant Examiner* — Sunghyoun Park
(74) *Attorney, Agent, or Firm* — Pillsbury Winthrop Shaw Pittman LLP

(57) ABSTRACT

A method for controlling a multimedia decoder that can simultaneously access different programs from different sources and/or of different qualities, wherein the decoder can operate in a multitask mode such that it controls the display and/or recording of a first program simultaneously with the display and/or recording of a second program, wherein the decoder performs the following steps: the step of identifying the resources available for displaying and/or recording programs accessible by the decoder; the step of determining the resources required for displaying and/or recording each of the programs accessible by the decoder; and the step in multitask mode of inhibiting a displaying and/or recording control of one of these programs when the resources required by the ordered program are higher than the available resources of the decoder.

6 Claims, 4 Drawing Sheets

METHOD FOR CONTROLLING A DECODER AND DECODER FOR IMPLEMENTING SAID METHOD

CROSS REFERENCE TO RELATED APPLICATIONS

This application is the U.S. National Stage of PCT/EP2010/058654, filed Jun. 18, 2010, which in turn claims priority to French Patent Application No. 0954100, filed Jun. 18, 2009, the entire contents of all applications are incorporated herein by reference in their entireties.

TECHNICAL FIELD OF THE INVENTION

The present invention relates to a method of controlling a decoder as well as a decoder implementing this method, particularly a decoder of the STB (Set Top Box) type, connected to a display terminal.

TECHNOLOGICAL BACKGROUND OF THE INVENTION

Decoders are known that receive multimedia content from different sources, for example from a digital terrestrial broadcasting network, from an Internet network, from a hard disk, or even from a satellite network, these sources subsequently being named respectively a DTT network, an IP network, an HDD network or a SAT network. Associated with the diversity of sources, this multimedia content may be transmitted, via a same source or via different sources, according to different qualities.

For example, enabling a decoder to access multimedia content via the IP network either in high quality HD (High Definition), or in standard quality SD (Standard Definition) is known. Subsequently, multimedia content transmitted by a given source with a given quality is called a program.

GENERAL DESCRIPTION OF THE INVENTION

Considering the large diversity of programs to which a decoder may have access, it seems that its operation may be compromised when a user simultaneously requires the processing of a plurality of programs, this situation being subsequently named a multitask situation.

Typically, this multitask situation appears when a decoder wishes to simultaneously process a first program and a second program in view of obtaining their display(s) and/or recording(s).

In this case, the available resources of the decoder may be less than the resources required to carry out these display and/or recording operations.

Consequently, the decoder may not operate satisfactorily, such that at least one processing is compromised, which diminishes the quality perceived by the user of a decoder.

The present invention aims to remedy this problem by proposing a method of controlling a decoder, preventing the execution of a control that may compromise the satisfactory operation of a decoder in multitask mode. This is the reason that the invention relates to a method for controlling a multimedia decoder that may simultaneously access different programs from different sources and/or of different qualities, wherein the decoder may operate in a multitask mode such that it controls the display and/or recording of a first program simultaneously with the display and/or recording of a second program, characterized in that the decoder carries out the following steps:

- the step of identifying the resources available for displaying and/or recording programs accessible by the decoder,
- the step of determining the resources required for displaying and/or recording each of these programs accessible by the decoder, and
- the step, in multitask mode, of inhibiting a displaying and/or recording control of one of these programs when the resources required by the ordered program are higher than the available resources of the decoder.

Thanks to the invention, the satisfactory operation of a decoder in multitask mode is ensured since a control that may compromise this operation is inhibited before it is executed.

Thus, the method particularly requests a decoder user to deactivate a display and/or a recording in progress to release the resources necessary for the transmitted control.

In other words, the method maintains the decoder in an operation such that its resources may respond to the requests of its user and, thus, operate in a manner that is satisfactory for the latter.

The method according to the invention may also present one or more of the characteristics below, considered individually or according to all technically possible combinations.

In one embodiment, the decoder determines the resources required to display and/or record each accessible program according to the source and/or the quality of this accessible program.

According to an embodiment, the source of each accessible program is one of the following sources: A digital terrestrial network, a network using the IP (Internet Protocol) protocol, a satellite network, a hard disk, a demultiplexer, a fiber optic cable network.

In one embodiment, the quality of each accessible program is determined by a bandwidth and/or by a format of the HD (High Definition) type.

According to one embodiment, the decoder identifies its available resources and the resources required for each accessible program in the form of a quantity of required memory.

In one embodiment, the decoder generates a message to a decoder user to display at least one of the following elements: Control inhibition information, a new control request.

According to an embodiment, the decoder displays and/or records a program whose multimedia content corresponds to the content of the ordered program with a different source and/or quality.

In one embodiment, the decoder communicating with a remote server to request the transmission of a program, the decoder inhibits a control by blocking the communication with the remote server and/or by blocking the processing of the program transmitted by the remote server.

According to an embodiment, the remote server regularly controlling the display of a transmitted stream, the decoder simulates this display with relation to the remote server when the information message is displayed.

The invention also relates to a multimedia decoder that may simultaneously access different programs with different sources and/or different qualities, this decoder may operate according to a multitask mode such that it simultaneously controls the display of a first program and the recording of a second program, characterized in that the invention comprises means to implement a method in conformance with one of the previous claims, these means comprising:

- means for identifying the resources available for displaying and/or recording programs accessible by the decoder,
- means for determining the resources required for displaying and/or recording each of these programs, and means for inhibiting, in multitask mode, a displaying and/or recording control of one of these programs when the resources required by the ordered program are higher than the available resources of the decoder.

BRIEF DESCRIPTION OF THE FIGURES

Other characteristics and advantages of the invention will clearly emerge from the description given below, for indicative and in no way limiting purposes, with reference to the attached figures in which.

DESCRIPTION OF THE PREFERRED EMBODIMENTS OF THE INVENTION

Figure 1:
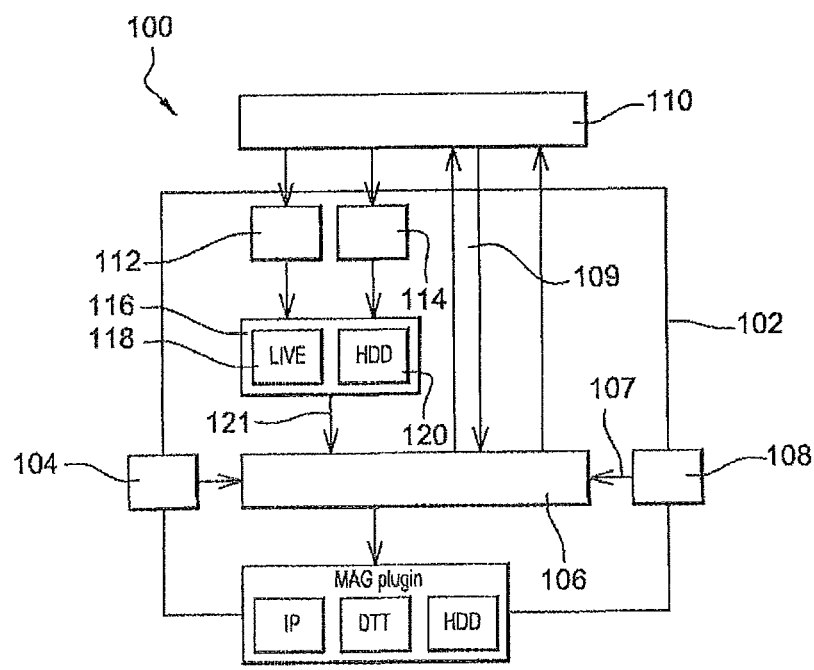
FIG. 1 schematically represents a system equipped with a decoder in conformance with the invention, FIG. 2 schematically illustrates different steps implemented by a method in conformance with the invention, FIG. 3 schematically represents the management of resources of a decoder in conformance with the invention.

FIG. 1 functionally represents a system 100 in conformance with the invention, i.e., equipped with a decoder 102 that may simultaneously access different programs 104 from different sources and/or of different qualities and that may operate according to a multitask mode such that it simultaneously controls the displaying and/or recording of a first program and of a second program.

In conformance with the invention, decoder 102 comprises control means 106 for:
  identifying the resources available for displaying and/or recording programs 104 accessible by the decoder 102,
  determining the resources required for displaying and/or recording each of these programs 104, and
  in multitask mode, inhibiting a displaying and/or recording control 108 of one of these programs when the resources required by the ordered program are higher than the available resources of the decoder.

In this embodiment, the decoder maintains communication with a portal 110 transmitting programs on request by the decoder 102, for example via the IP network. In this case, the decoder comprises software modules 112 and 114 that cooperate with the browser 116 of the decoder for direct or "live" transmissions, step 118, or deferred transmissions after recording onto a hard disk 120.

Control means 106 of the decoder may then carry out a dual control of the capacity of the decoder to maintain a satisfactory operation, i.e.:
  during reception 107 of the control by the decoder, or
  during reception 121 of the content transmitted by portal 110, this second control particularly enabling control 108 to be inhibited if the decoder resources are reduced after the transmission of a request 109 to transmit a program.

If these controls are satisfactory, decoder 102 executes the control required in multitask mode, typically a dual stream mode, by enabling the display and/or recording in conformance with control 107 by means of "IP," "DTT" or "HDD" software dedicated to each source.

If one of these controls is not satisfactory, decoder 102 generates a message to a decoder user to inform this user of the inhibition of the control and/or to request a new control.

For example, if control 108 requests the recording of an HD program whose content is accessible via another SD program, decoder 102 may inform/request the execution of control 108 from this SD program in order to limit the required resources.

In this case, decoder 102 displays and/or records a program whose multimedia content is identical to the content of the ordered program but whose source is different.

Figure 2:
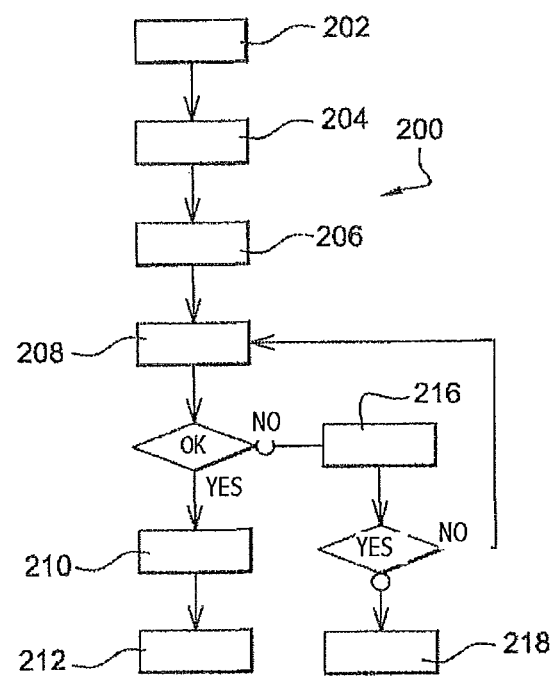

FIG. 2 represents an algorithm 200 representing different steps that may be implemented by a method in conformance with the invention, i.e.:
  a step 202 such that a user sends the control to display and/or record a program,
  a step 204 such that the decoder identifies the ordered program,
  a step 206 such that the decoder initializes the request of its resources,
  a step 208 such that the decoder compares its available resources with the resources required by the control such that:
Either the required resources are available, in which case the decoder transmits (210) the control to the portal and executes (212) the control, or the required resources are not available, in which case the decoder may carry out a search (216) for an alternative solution to propose a substitute control to the user, typically the display and/or recording (218) of a program of lower quality than the program ordered, but with the same content.

Figure 3:
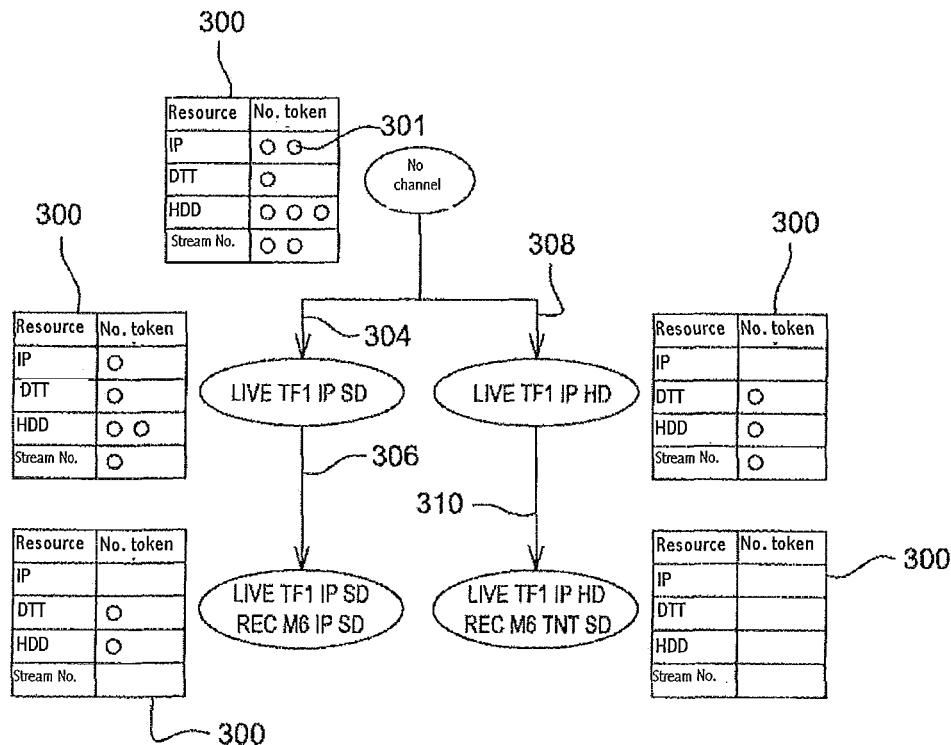

An illustration of this implementation is shown in FIG. 3 that represents the development of available resources in table 300 that develop according to the operation of a decoder to which it is associated, for example decoder 102 of FIG. 1.

In this example, the available resources of the decoder and the resources required by the programs in the form of a quantity of required memory represented by tokens 301 are identified.

Prior to any control, the resources required by each program accessible by the decoder are determined by agreeing that:
  For the IP network, an HD program requires two resource tokens while an SD program only requires a single resource token.
  In a practical manner, the quality of a program transmitted via the IP network may be determined by an indication from the content provider, for example a client field in the data coding such as an "HD.subscription" file extension, or by automatic detection using tests that, for example, measure packet losses and/or signal to noise ratios (PSNR).
  For the DTT network, the number of received channels, or tuner, implemented determines the number of tokens available for this source.
  For the demultiplexer, the number of streams that may be taken into account by the decoder determines the number of tokens. The demultiplexer may limit the maximum number of streams received by the decoder.
  For the SAT network, the tuner number determines the number of tokens available for this resource.
  A limitation is connected to the number of streams that may be processed by the decoder.
  It should be noted that the resources of the decoder utilizing the table are identified according to the sources accessible before any processing of a channel, in this example for the IP network (2 tokens) and for the DTT network (1 token), as well as for the HDD hard disk (3 tokens).

In addition, the number of streams that may be taken into consideration by the decoder is determined prior to any operation, in this case limited to a dual-stream operation (2 tokens).

Following a request 304 for the display, or "live" transmission, of a program "TF1" issued from the IP network in SD quality, the resource table 300 is modified to take into account the attribution of resources from the IP network at this display.

More precisely, the IP network resources are then limited to 1 token, the second token being used for the display of the TF1 program.

At the same time, multistream resources are reduced by a token since a stream is taken into account, as well as the resources of the hard disk (HDD) that provisionally processes the displayed stream.

During a second control 306 intended to record "Rec" a program "M6" in SD standard quality via the IP network, the decoder passes into multitask mode and implements the invention to verify the availability of the resources.

This recording is enabled since, in this case, the required resources, i.e., a token from the IP network, a token from the HDD hard disk and a token for the number of streams, are available as illustrated in table 300 after the previous step.

This is not the case when the same decoder receives a control 308 for the "live" display of the "TF1" program in high quality HD. In this case, the resources required at the level of the IP network correspond to all of the available resources of the decoder—two tokens.

Consequently, a second control 310 to record "Rec" the "M6" program in SD standard quality via the IP network may not be satisfactorily taken into consideration. Also the decoder passes into multitask mode by implementing the invention so as to inhibit this control and, for example, obtain the "M6" content ordered by the user by another source whose resources are available, i.e., the DTT network in this example.

Figure 4:
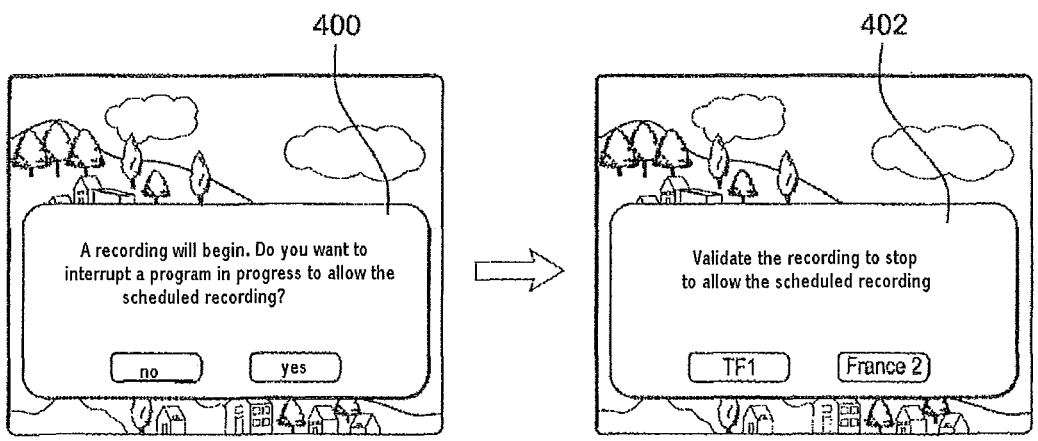
FIGS. 4, 5 and 6 represent screenshots of messages generated by a decoder in conformance with the invention.

With reference to FIG. 4, a first example of a message 400 controlled by the decoder is illustrated in a multitask, or multistream, situation, such that a first program "TF1" and a second program "France 2" are being recorded, this second program also being displayed.

Following the actuation of a scheduled recording control, the decoder detects an insufficiency of available resources in relation to the resources required by this third recording; this decoder cannot run three streams simultaneously.

This is why, after having inhibited the recording control of the third program, a message 400 is displayed to request a new control from the user, i.e., the suspension of one of the recordings in progress that the user may identify in a second message 402.

Figure 5:
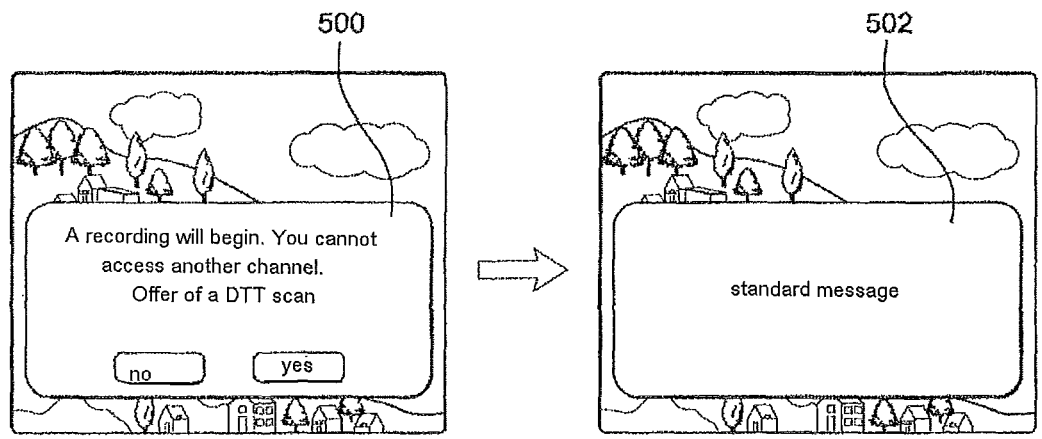

With reference to FIG. 5, a second example of a message 500 is illustrated in a multitask situation such that, a first program being recorded, a control to record a second program is inhibited since, the available resources of the decoder are insufficient to record the content of this scheduled program at high quality HD.

This is why message 500 proposes to the user to search for the required content from a different source, in this instance the DTT network, requesting the available resources of the decoder, a standard message 502 may confirm the choice of the user.

Figure 6:
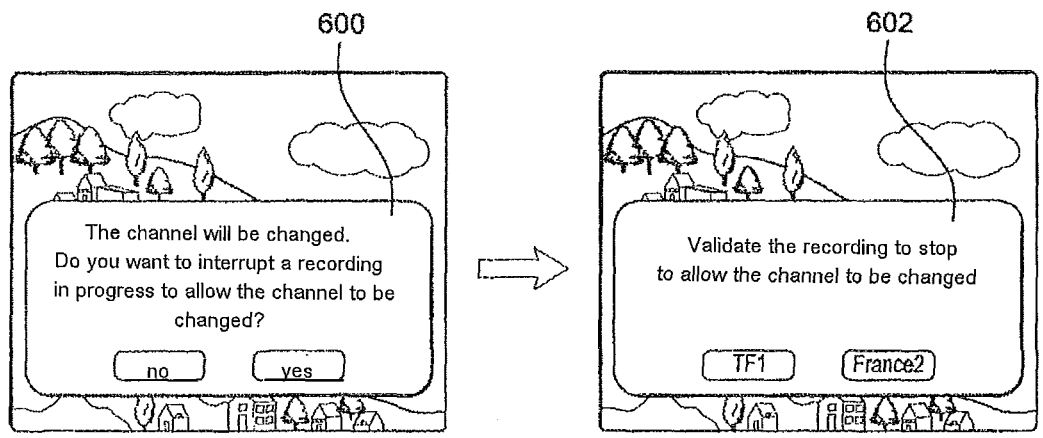

With reference to FIG. 6, a third example is illustrated in a multitask, or multistream, situation, such that a first program "TF1" and a second program "France 2" are being recorded, this second program also being displayed.

Following the actuation of a scheduled display control of a third program, the decoder detects an insufficiency of available resources in relation to the resources required by this third recording; this decoder cannot run three streams simultaneously.

This is why, after having inhibited the displaying control of the third program, a message 600 is displayed to request a new control from the user, i.e., the suspension of one of the recordings in progress that the user may identify in a second message 602.

Figure 7:
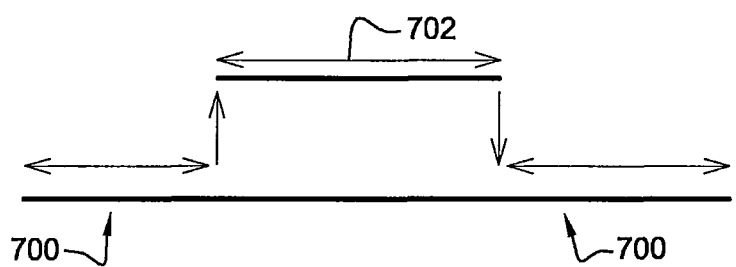
FIGS. 7, 8 and 9 represent diagrams of an optional step in the implementation of the invention.
Figure 8:
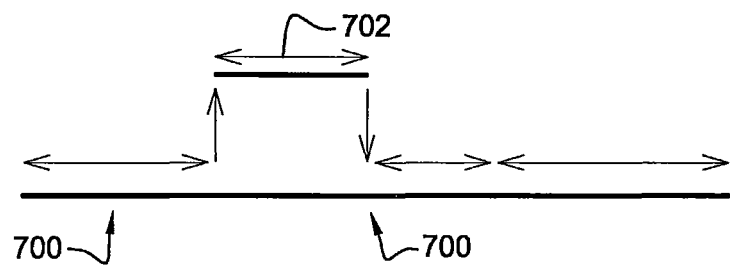
Figure 9:
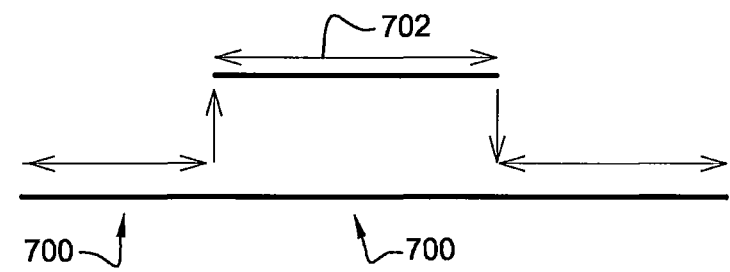

The present invention is open to many variations. With reference to FIGS. 7, 8 and 9, a variation is illustrated enabling a message displayed by the decoder in case of inhibition of a control to be maintained.

Indeed, a decoder may be associated with a portal as described previously with reference to FIG. 1. In this case, the portal comprises means to control the display of a transmitted program, or if necessary, to suspend the transmission of this program.

As shown in FIG. 7, requests 700 are thus transmitted by the portal to the decoder while, possibly, message 702 of the decoder may be displayed between two such requests.

However, it is possible that a display request 700 transmitted by the portal is transmitted as the decoder message is in progress (FIG. 8), which disrupts its reading and/or its comprehension by a decoder user.

In this case, it is desirable that the decoder comprises means, for example software, to prevent request 700 from the portal from being taken into consideration (FIG. 9). For example, the decoder may simulate the display of the program transmitted by the portal to the latter as the decoder message is being displayed.

In one embodiment, the decoder implements service plans that identify, for each network, programs according to their multimedia content.

Thus, the decoder may utilize the plan of services from different networks to identify a possible access to a same content and then, in a multitask mode, propose/require a content to be obtained according to a program that is different from the ordered program.

In one embodiment, the decoder records a state machine that lists all of the multitask modes of operation requiring resources less than its available resources.

It is also possible to take into account possible subscriptions to one or more programs, or even to networks such as fiber optic cable, as a parameter defining a program.

The invention claimed is:

1. A method for controlling a multimedia decoder configured to simultaneously access different programs from different sources and/or of different qualities, wherein the decoder is configured to operate in a multitask mode such that the decoder controls the display and/or recording of a first program simultaneously with the display and/or recording of a second program, the method comprising:

identifying available resources to display and/or record programs accessible by the decoder, determining required resources to display and/or record each of the programs accessible by the decoder, the decoder identifying the available resources and the resources required by each accessible program in the form of a quantity of required memory, and in multitask mode, inhibiting a control to display and/or record one of the programs when the resources required by the ordered program are higher than the available resources of the decoder, the decoder inhibiting the control by blocking a communication with a remote server to request transmission of the program, and/or by blocking processing of the program transmitted by the remote server, generating an information message, by the decoder to a decoder user, to display at least one of the following elements: control inhibition information or a new control request, and simulating by the decoder, with relation to the remote server, a display of a transmitted stream, controlled by the remote server, when the information message is displayed.

2. The method according to claim 1, wherein the decoder is configured to determine the resources required to display and/or record each accessible program according to the source and/or the quality of the accessible program.

3. The method according to claim 2, wherein the source of each accessible program is one of the following sources: A digital terrestrial network, a network using the IP (Internet Protocol) protocol, a satellite network, a hard disk, a demultiplexer, a fiber optic cable network.

4. The method according to claim 3, wherein the quality of each accessible program is determined by a bandwidth and/or by a format of the HD (High Definition) type.

5. The method according to claim 1, wherein the decoder is configured to display and/or record a program whose multimedia content corresponds to the content of the ordered program with a different source and/or quality.

6. A multimedia decoder configured to simultaneously access different programs with different sources and/or different qualities, the decoder configured to operate according to a multitask mode so as to simultaneously control the display of a first program and the recording of a second program, the decoder comprising:

a first module configured to identify resources available for displaying and/or recording programs accessible by the decoder, a second module configured to determine resources required for displaying and/or recording each of the programs, a third module configured to inhibit, in multitask mode, a control to display and/or record one of the programs when the resources required by the ordered program are higher than the available resources of the decoder, and a fourth module configured to block a communication with a remote server to request transmission of the program and/or to block the processing of the program transmitted by the remote server, the decoder being configured to generate an information message to a decoder user, to display at least one of the following elements: control inhibition information or a new control request, the decoder being further configured to simulate, with relation to the remote server, a display of a transmitted stream, controlled by the remote server, when the information message is displayed.

* * * * *